Oct. 19, 1937.　　　　D. NELSON　　　　2,096,195
AUTOMOBILE SUPPORTING DEVICE
Filed July 27, 1936　　　　2 Sheets-Sheet 1

Inventor
Dewey Nelson
By Clarence A. O'Brien
Hyman Berman
Attorneys

Oct. 19, 1937.　　　D. NELSON　　　2,096,195
AUTOMOBILE SUPPORTING DEVICE
Filed July 27, 1936　　　2 Sheets-Sheet 2

Inventor
Dewey Nelson
By Clarence A. O'Brien
Hyman Berman
Attorneys

Patented Oct. 19, 1937

2,096,195

UNITED STATES PATENT OFFICE 2,096,195

AUTOMOBILE SUPPORTING DEVICE

Dewey Nelson, Kewaunee, Wis.

Application July 27, 1936, Serial No. 92,856

4 Claims. (Cl. 254—88)

The present invention relates to new and useful improvements in automobile supporting devices and has for its primary object to provide, in a manner as hereinafter set forth, a device of this character which is adapted to support the front wheels, for example, of an automobile in elevated position and permit said wheels to be turned as desired to facilitate working on the vehicle.

Another very important object of the invention is to provide a supporting device of the aforementioned character for automobiles embodying a construction and arrangement which is such that the danger of the mechanic sustaining injury by the accidental dropping of the vehicle will be eliminated.

Still another very important object of the invention is to provide means for locking the rotary portion of the device against movement, said means being operable to released position by the vehicle after said vehicle is safely mounted thereon.

Other objects of the invention are to provide an automobile supporting device of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
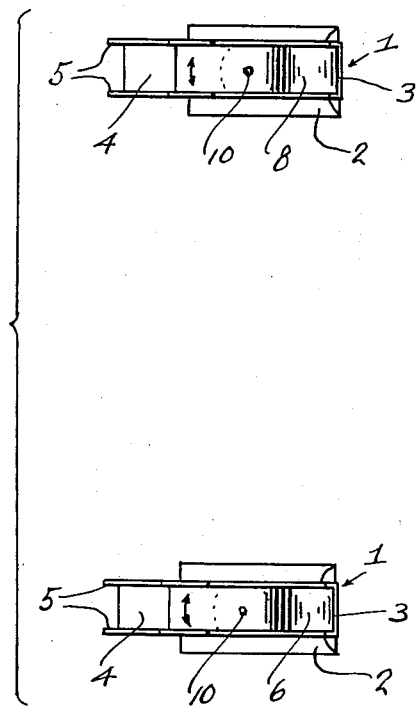
Figure 1 is a top plan view, showing a pair of the devices constituting the present invention in position for use.
Figure 2:
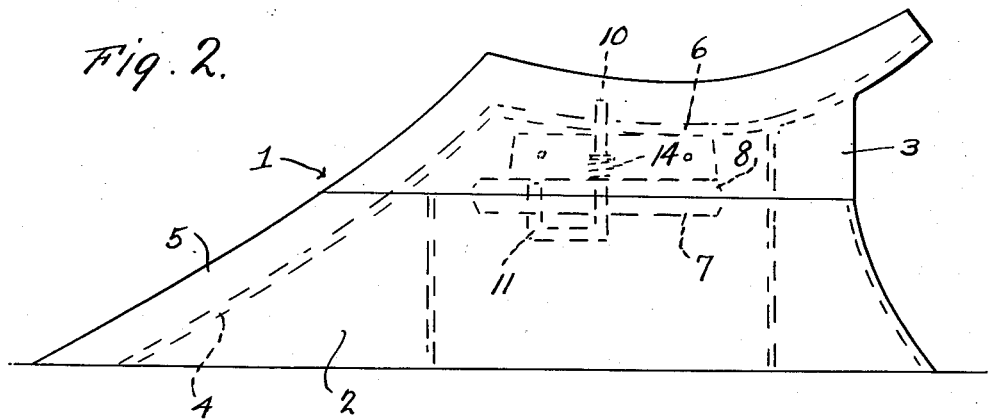
Figure 2 is a view in side elevation of the invention.

Referring now to the drawings in detail, it will be seen that the embodiment of the device which has been illustrated comprises a supporting structure which is designated generally by the reference numeral 1, said supporting structure being substantially of hollow cast iron construction and including a base 2 on which a top 3 is rotatably mounted. The forward end portions of the base 2 and the top 3 are formed to provide an inclined approach 4 having upstanding side flanges 5. The reference numeral 6 designates a trough on the top 3 which communicates with the approach 4 for receiving the wheel of the vehicle therefrom.

Figure 3:
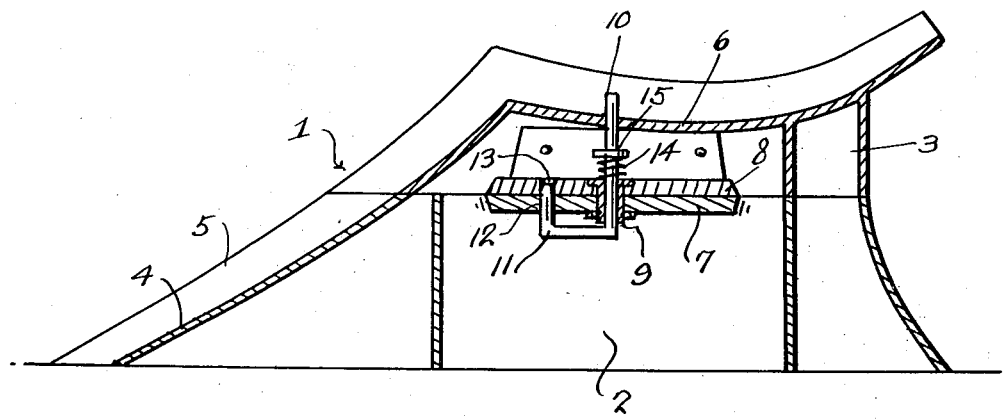
Figure 3 is a view in vertical longitudinal section through the device.
Figure 4:
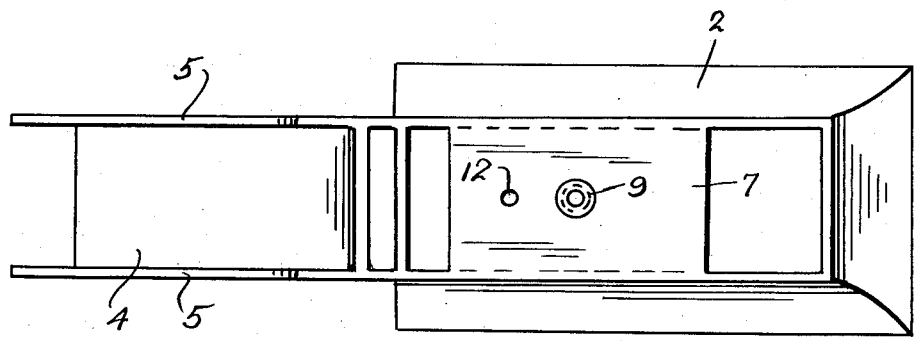
Figure 4 is a top plan view of the lower portion or base of the invention.

Traversing the upper portion of the base 2 is a metallic plate 7. Mounted transversely in the lower portion of the rotary top 3 is a metallic plate 8 which rests on the plate 7. A bearing 9 extends through the plates 7 and 8 and rotatably and slidably mounted in said bearing is a pin 10 which projects upwardly into the trough 6. This is best seen in Figure 3 of the drawings.

Projecting from the lower end of the pin 10 is an angular bolt 11 which is engageable in openings 12 and 13 which are provided therefor in the plates 7 and 8, respectively, for releasably securing the top 3 against rotation on the base 2. A coil spring 14 encircles the pin 10 and is engaged with a collar 15 on said pin for yieldingly urging the same upwardly.

It is thought that the operation of the device will be readily apparent from a consideration of the foregoing. It may be well to here state that two of the devices are preferably used, one for each of the front wheels of the vehicle. The tops 3 are normally secured in longitudinal position on the bases 2 by the bolts 11. The front wheels of the vehicle are driven up the approaches 4 and are brought to rest in the troughs 6. When the wheels enter the troughs 6 the pins 10 are engaged and depressed thereby against the tension of the coil springs 14, thus disengaging the bolts 11 from the openings 12 and 13, or at least from the latter. This renders the tops 3 free to rotate about the pins 10, thus allowing the front wheels of the automobile to be conveniently turned to any desired position to facilitate the work of the mechanic. Further, the construction and arrangement is such that there will be little or no danger of the wheels falling off of the devices and injuring the mechanic.

It is believed that the many advantages of a safety device constructed in accordance with the present invention will be readily understood, and although a preferred embodiment of said device is as illustrated and described, it is to be understood that changes in the details of construction and in the combination and arrangement of parts may be resorted to which will fall within the scope of the invention as claimed.

What is claimed is:—

1. An automobile supporting device comprising a base, a top rotatably mounted on said base and adapted to receive the wheel of an automobile, and means operable to inoperative position by said automobile wheel for releasably locking said top against rotation on said base.

2. An automobile supporting device comprising a base, a top rotatably mounted on said base, said top being adapted to receive and support the wheel of an automobile, a slidable pin rotatably connecting the top to the base, and a bolt on said pin for releasably locking the top against rotation on the base, said pin being engageable and operable by said wheel for shifting the bolt to inoperative position.

3. An automobile supporting device comprising a base, and a top rotatably mounted on said base, said top including a trough for the reception of the wheel of an automobile, said top and the base constituting a supporting structure comprising an inclined approach communicating with the trough, a slidable pin rotatably connecting the top to the base, said pin projecting into the trough for engagement and actuation by the wheel, and a bolt on said pin for releasably locking the top against rotation on the base.

4. An automobile supporting device of the class described comprising a metallic supporting structure including an inclined wheel approach having upstanding side flanges, said supporting structure further including a base and a top rotatably mounted on said base, said top comprising a trough communicating with the approach for receiving a wheel therefrom, opposed plates mounted transversely in the upper and lower portions of the base and the top, respectively, a pin extending slidably through the plates and constituting means for rotatably connecting the top to the base, said pin projecting upwardly into the trough for engagement and actuation by the wheel, a coil spring engaged with the pin for yieldingly urging the same upwardly, the plates having openings therein adapted to be brought into registry, and an angular bolt on the pin engageable in the openings for releasably locking the top against rotation on the base.

DEWEY NELSON.